United States Patent

Kobayashi

[11] Patent Number: 5,933,143
[45] Date of Patent: *Aug. 3, 1999

[54] METHOD AND APPARATUS FOR DISPLAYING A TREE STRUCTURE DIAGRAM REPRESENTING A RELATIONSHIP AMONG WINDOWS WITH ICONS REPRESENTING RESPECTIVE WINDOWS

[75] Inventor: Yoko Kobayashi, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/921,519

[22] Filed: Sep. 2, 1997

Related U.S. Application Data

[63] Continuation of application No. 08/615,163, Mar. 12, 1996, abandoned.

[30] Foreign Application Priority Data

Jul. 31, 1995 [JP] Japan .................................. 7-195453

[51] Int. Cl.⁶ .................................................. G06T 11/00
[52] U.S. Cl. .......................................... 345/346; 345/340
[58] Field of Search ..................................... 345/346, 344, 345/345, 340, 343, 326, 339, 341, 357, 140

[56] References Cited

U.S. PATENT DOCUMENTS

| | | | |
|---|---|---|---|
| 4,860,204 | 8/1989 | Gendron et al. | 364/300 |
| 5,195,178 | 3/1993 | Krieger et al. | 395/157 |
| 5,212,771 | 5/1993 | Gane et al. | 395/160 |
| 5,241,645 | 8/1993 | Cimral et al. | 395/500 |
| 5,249,300 | 9/1993 | Bachman et al. | 395/800 |
| 5,375,125 | 12/1994 | Oshima et al. | 371/19 |
| 5,606,654 | 2/1997 | Schuur | 345/140 |
| 5,621,905 | 4/1997 | Jewson et al. | 345/353 |
| 5,627,979 | 5/1997 | Chang et al. | 345/335 |
| 5,630,125 | 5/1997 | Zellweger | 395/614 |
| 5,644,776 | 7/1997 | DeRose et al. | 395/761 |
| 5,668,966 | 9/1997 | Ono et al. | 345/356 |

FOREIGN PATENT DOCUMENTS

| | | | |
|---|---|---|---|
| 1-276194 | 11/1989 | Japan | G09B 1/00 |
| 2-171917 | 7/1990 | Japan | G09B 1/00 |
| 6-036043 | 2/1994 | Japan | G06F 15/00 |

*Primary Examiner*—Steven P. Sax
*Attorney, Agent, or Firm*—Staas & Halsey

[57] ABSTRACT

A tree structure diagram is displayed with icons which indicate functions of corresponding windows. The tree structure diagram represents a hierarchical relation between windows used in a multi-window system. An icon is added to each window to be arranged in a tree structure. The icon has an image indicating a function of the respective one of windows. The tree structure diagram is displayed together with the icon added to each window.

13 Claims, 17 Drawing Sheets

FIG. 3
PRIOR ART

| WINDOW LIST | |
|---|---|
| TITLE 1 | a |
| TITLE 2 | a. a |
| TITLE 3 | a. b |
| TITLE 4 | a. a. a |
| TITLE 5 | a. a. a. a |
| TITLE 6 | a, a, a, b |
| EXECUTE | LIST |

```
LEVEL NUMBER : 0
     ID ICON : R
      WINDOW : WHOLE SYSTEM
```

```
LEVEL NUMBER : 1
     ID ICON : F
      WINDOW : F 1
```

```
LEVEL NUMBER : 2
     ID ICON : B
      WINDOW : B 1
```

```
LEVEL NUMBER : 2
     ID ICON : B
      WINDOW : B 2
```

```
LEVEL NUMBER : 2
     ID ICON : S
      WINDOW : S 1
```

```
LEVEL NUMBER : 1
     ID ICON : F
      WINDOW : F 1
```

```
LEVEL NUMBER : 2
     ID ICON : G
      WINDOW : G 1
```

```
LEVEL NUMBER : 3
     ID ICON : P
      WINDOW : P 1
```

<u>200</u>

LEVEL NUMBER : 0
ID ICON : ⌂
WINDOW : FAMILY1

LEVEL NUMBER : 1
ID ICON : ▢
WINDOW : form1

LEVEL NUMBER : 2
ID ICON : ▢
WINDOW : ComboBox1

LEVEL NUMBER : 2
ID ICON : ⬇
WINDOW : Push1

LEVEL NUMBER : 2
ID ICON : ▭
WINDOW : HScroll1

LEVEL NUMBER : 2
ID ICON : ▢
WINDOW : ListBox1

LEVEL NUMBER : 2
ID ICON : ☒
WINDOW : CheckBox1

METHOD AND APPARATUS FOR DISPLAYING A TREE STRUCTURE DIAGRAM REPRESENTING A RELATIONSHIP AMONG WINDOWS WITH ICONS REPRESENTING RESPECTIVE WINDOWS

This application is a continuation, of application Ser. No. 08/615,163, filed Mar. 12, 1996, now abandoned.

BACKGROUND OF THE INVENTION

1. Field of the Invention

The present invention relates to a method and apparatus for displaying a tree structure diagram representing a relation among windows prepared for assisting a computer operation, and more particularly to a method and apparatus for displaying a tree structure diagram for windows which tree structure diagram is provided with icons which graphically indicate the contents of respective windows.

Such display of the tree structure diagram of windows is particularly helpful as a tool for developing programs of multi-window systems operated with a graphical user interface. Each window in the multi-window system has a parentage (parent-child relationship). It is important to easily recognize the parentage of windows over an entire multi-window system when developing the multi-window system.

2. Description of the Related Art

FIG. 1 is an illustration of a screen displayed by a first conventional system in which information regarding each window can be displayed. FIG. 1-(A) shows a current window displayed on the screen; FIG. 1-(B) shows a display presenting a parentage between the current window and the selected one of windows provided in the current window. When the level of the window having a title "List 1" in the current window shown in FIG. 1-(A) is searched, the window "List 1" in the current window is clicked by a mouse. By doing this, information including the parentage of the window "List 1" is displayed as shown in a table in FIG. 1-(B).

However, the above-mentioned first conventional system displays information with respect to only the window currently being focused. Thus, although the title of the parent window can be displayed, it is difficult to recognize a relation between the focused window and other windows. Accordingly, in order to obtain the parentage among all windows, each of the windows must be opened by clicking by a mouse. This is inconvenient and requires a considerably long time. Additionally, it is difficult to know the function of each of the windows without executing the program designated by each of the windows.

FIG. 2 is an illustration of a screen displayed by a second conventional system in which information regarding each window can be displayed. FIG. 2-(A) shows a current window displayed on the screen; FIG. 2-(B) shows a display presenting information of a list of windows provided in the current window. The display of FIG. 2-(B) is displayed on the screen by clicking the corresponding window provided in the current window.

This system merely displays the contents of the focused window, and it is not possible to recognize a parentage among the windows.

Japanese Laid-Open Patent Application No. 2-171917 discloses a multi-window control system in which information regarding a parentage among windows is included. This system automatically manages hierarchy information including parentage information. A list of a plurality of windows is displayed on the screen in accordance with the hierarchy information. In this system, the parentage is managed by a title and an identifier representing the hierarchy information which is provided to each window. The identifier of each of the windows is displayed together with the title in the form of a list table on the screen so that a desired window can be selected. The list of the windows is displayed as shown in FIG. 3.

In FIG. 3, the window corresponding to an identifier "a" is at the highest level. That is, in FIG. 3, the window having a title 1 is the highest order window. Windows having lower order are sequentially displayed in the order from a higher order to a lower order. That is, for example, the window having a title 2, which corresponds to an identifier "a.a", is a direct child of the window having the title 1. The window having a title 3, which corresponds to an identifier "a.b", is also a direct child of the window having the title 1, and is also a brother of the window having the title 2. Apparently, the window having a title 4, which corresponds to an identifier "a.a.a" is a child of the window having the title 2. In this way, the entire parentage among the windows can be observed.

According to the above-discussed conventional system, since the hierarchical relation between the windows is displayed with only the title of each window, it is difficult to know the function of the windows having a parentage.

Japanese Laid-Open patent Application No. 1-276194 discloses another multi-window display system which can provide information regarding a parentage between windows. In this system, as shown in FIG. 4, the contents of child windows can be displayed with the current window which is a parent window. The contents of the child windows are displayed in an overlapped relation with the respective parent window with lines connecting the corresponding window in the respective parent windows. This provides a visual display of the parentage among the windows. Additionally, this system can display a function of each child window by character strings.

As discussed above, this conventional system can display the parentage in a visual manner in which the parentage can be easily recognized. However, the information of each window is displayed by character strings. Thus, there is a problem in that it is difficult to quickly recognize the function of each window only by the character strings.

SUMMARY OF THE INVENTION

It is a general object of the present invention to provide an improved and useful method and apparatus for displaying a tree structure diagram representing relationship among windows with icons.

A more specific object of the present invention is to provide a method and apparatus for displaying a tree structure diagram by which an entire parentage among the windows can be easily recognized.

Another object of the present invention is to provide a method and apparatus for displaying a tree structure diagram with icons which indicate functions of corresponding windows.

In order to achieve the above-mentioned objects, there is provided according to one aspect of the present invention a method for displaying a tree structure diagram representing a hierarchical relationship between windows used in a multi-window system, the method comprising the steps of:

a) adding an icon to each window to be arranged in a tree structure, the icon representing a function of a respective one of the windows; and b) displaying the tree structure diagram together with the icon added to each of the windows.

The method may further comprise the steps of:

c) registering a title and parentage information of each window, the parentage information representing presence of a higher and/or lower order windows related with each window;

d) setting a level number and an icon in accordance with the parentage information of each window so that the tree structure diagram is displayed by the icon and the title of each window in accordance with the level number.

Additionally, a window at least one order higher than the selected window may be displayed together with the selected window when the lowest order window is selected from among the windows provided in the tree structure diagram displayed in step b).

The method may further comprise the step of:

e) changing the size of the icons and the title of the window provided in the tree structure diagram displayed in step b).

Additionally, a mark indicating a parentage may be added to each window in the tree structure diagram. The tree structure diagram may be displayed only with the icon of each window.

There is provided according to another aspect of the present invention an apparatus for displaying a tree structure diagram representing a hierarchical relation between windows used in a multi-window system, the apparatus comprising:

icon adding means for adding an icon to each window arranged in a tree structure, the icon representing a function of a respective window; and displaying means for displaying the tree structure diagram together with the icon added to each window by the icon adding means.

The apparatus according to the present invention may further comprise mark adding means for adding a mark indicating a parentage of each window in the tree structure diagram.

Additionally, windows having the same parent window may be defined as brother windows, and the displaying means may comprise first storing means for storing information of a child window, when a brother window has the child window, by relating with the brother window, together with a title of window.

Further, the icon adding means may comprise:

icon storing means for storing the icon of each window; and second storing means for adding an icon and a level number to each window in accordance with window relation information supplied by the first storing means, and storing window information sorted based on the level numbers.

The icon adding means may comprise icon creating means for creating an icon representing a function of each window, the icon being stored in the icon storing means. The icon creating means may defines a plurality of sizes of the icon so that one of the sizes is selected by an operator.

According to the above-mentioned invention, the tree structure diagram can be displayed with the icons representing functions of the respective windows. Thus, the function of each window can be easily and quickly recognized without reading the title of each window or character strings indicating the function of each window. Additionally, an entire relationship among the windows can be easily recognized by viewing the icons in the tree structure diagram.

In the present invention, the title of each window and the parentage information of each window is registered so as to add the level number to the window information. The window information is sorted based on the level number. Thus, the tree structure diagram is prepared by sequentially reading the window information by referring to the level number.

Additionally, if the operator selects the lowest order window from among the windows displayed on the screen, the windows one order higher than the selected window are automatically displayed on the same screen. Thus, the function of the selected window and the relation between the higher order windows can be recognized.

Further, since a size of the icon and title of each window in the tree structure diagram can be selected, the size of the icon an title of each window can be changed according to the size of the window in which the tree structure diagram is displayed. This increases flexibility of display of the window arrangement.

Additionally, in the present invention, since the mark representing the parentage of each window is added to the window information, presence of a child window can be recognized even when the child window is not displayed in the tree structure diagram on the screen.

The tree structure diagram according to the present invention may be provided with only icons. This simplify the display of the tree structure diagram without losing a feature of displaying the function of each window.

Other objects, features and advantages of the present invention will become more apparent from the following detailed description when read in conjunction with the accompanying drawings.

BRIEF DESCRIPTION OF THE DRAWINGS

FIG. 3 is an illustration of a screen displayed by a third conventional system in which a parentage between windows can be displayed;

FIG. 8 is an illustration for explaining icon information stored in an icon storing file shown in FIG. 5;

DETAILED DESCRIPTION OF THE PREFERRED EMBODIMENTS

Figure 1:
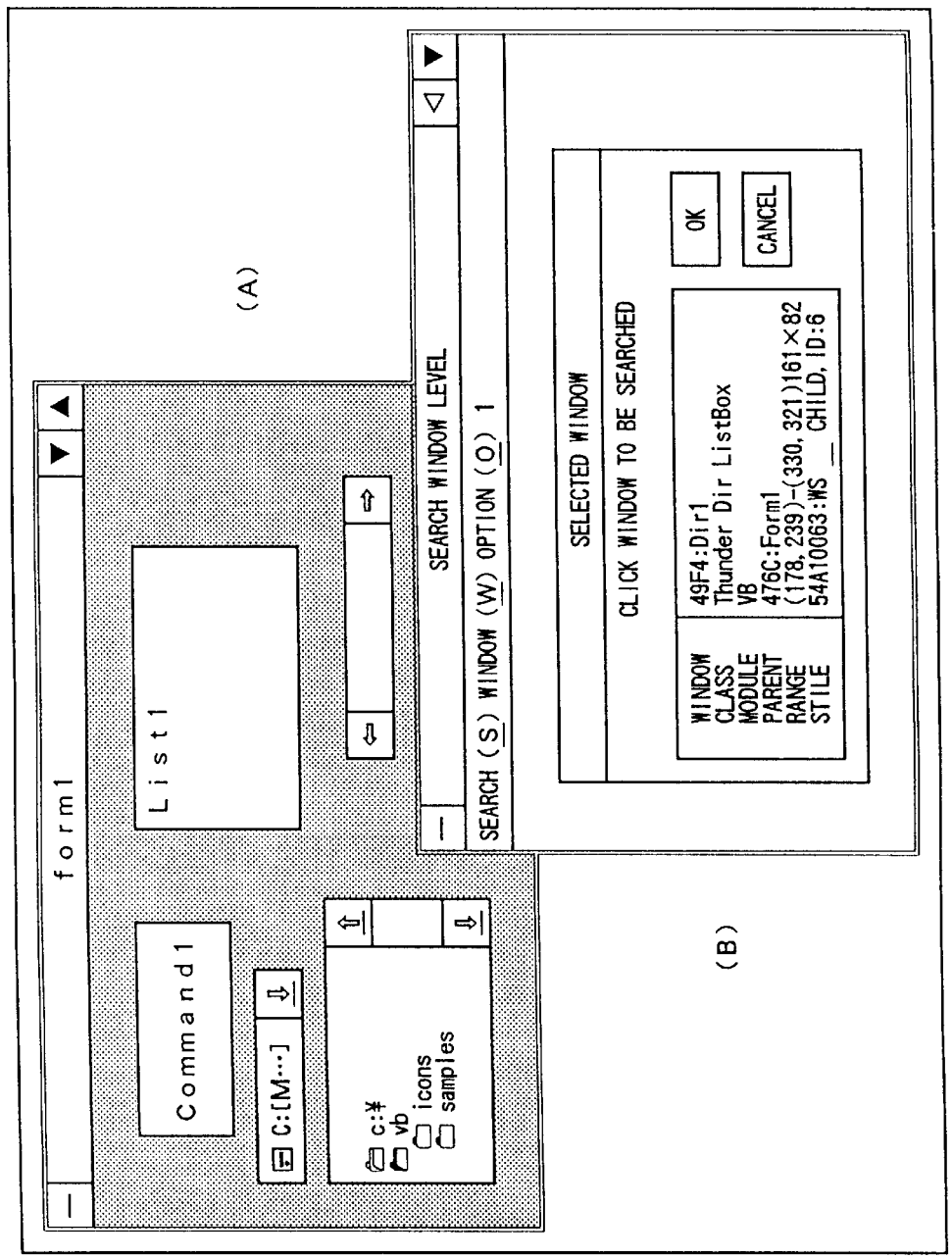
FIG. 1 is an illustration of a screen displayed by a first conventional system in which information regarding each window can be displayed.
Figure 2:
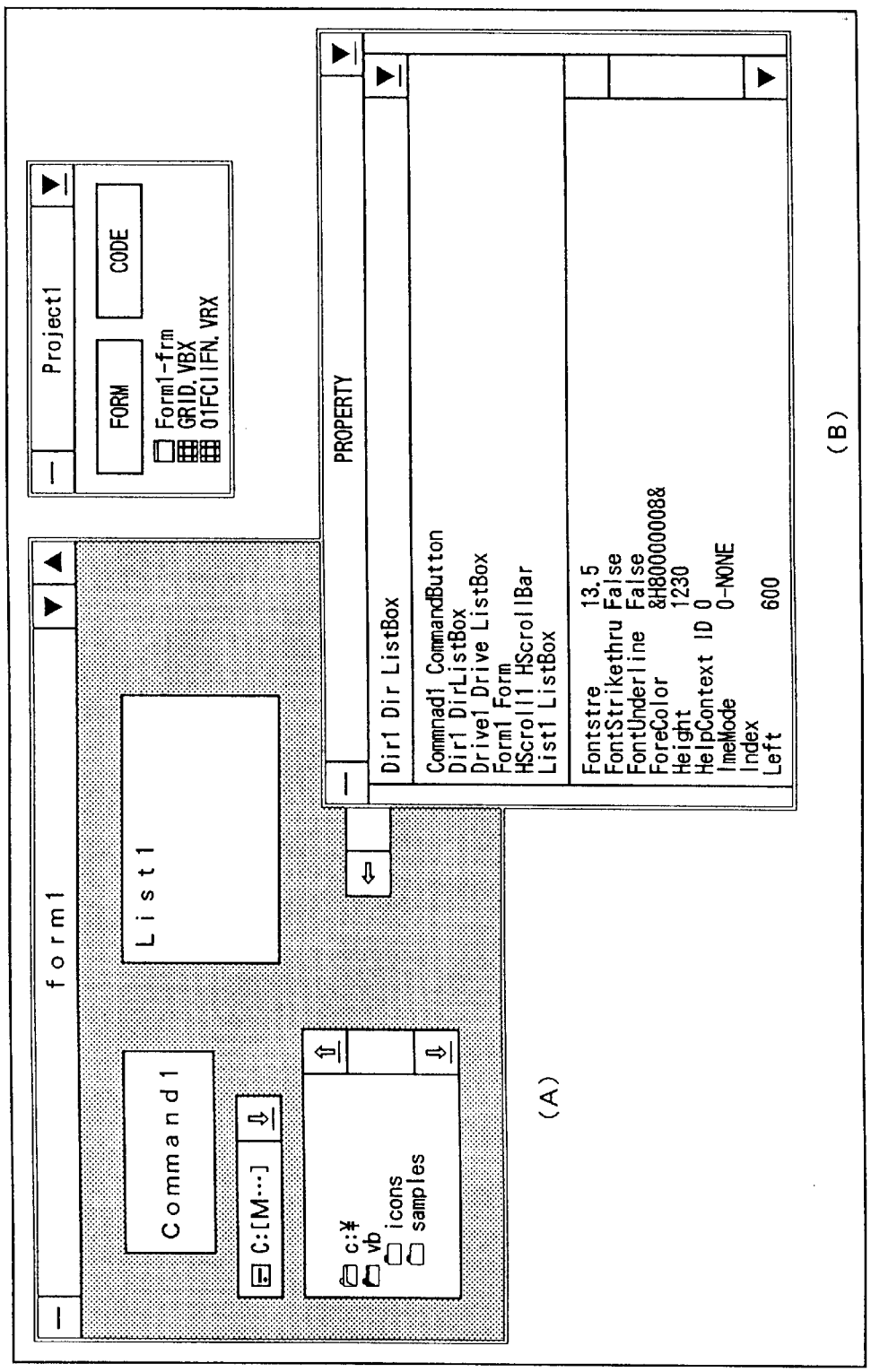
FIG. 2 is an illustration of a screen displayed by a second conventional system in which information regarding each window can be displayed.
Figure 4:
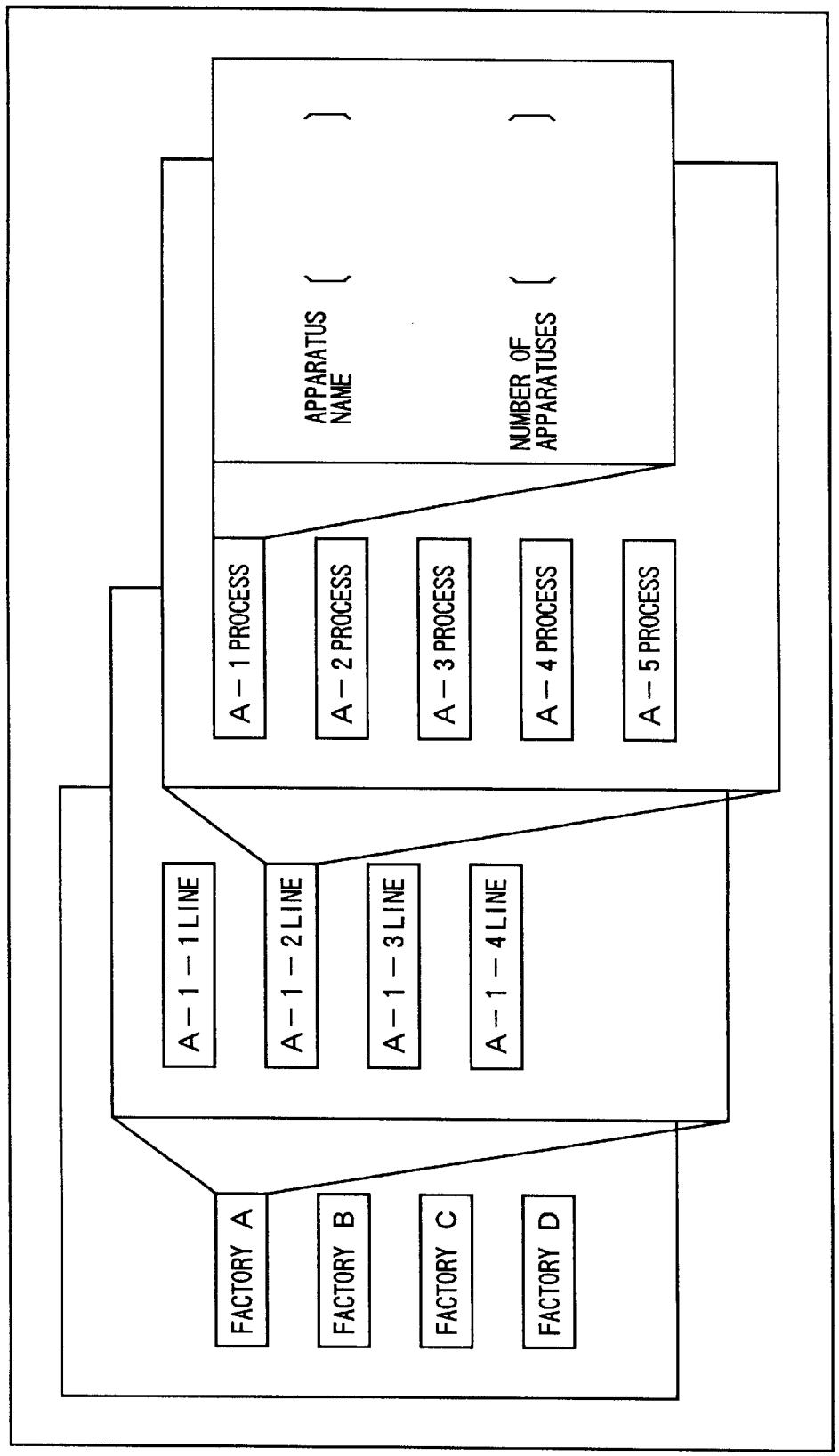
FIG. 4 is an illustration of a screen displayed by a fourth conventional system in which a parentage among windows can be displayed.
Figure 5:
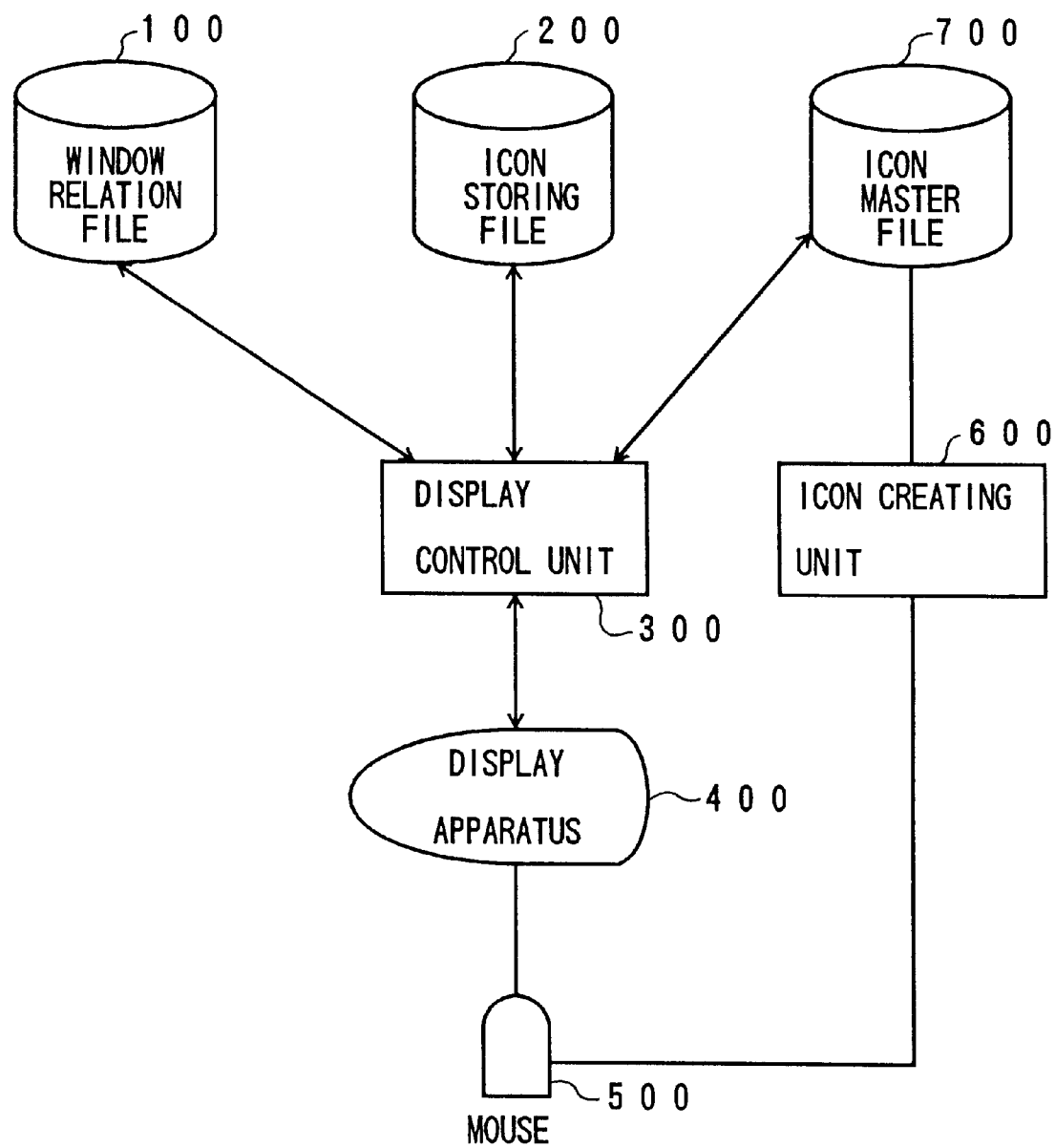
FIG. 5 is a block diagram of an apparatus for displaying a tree structure diagram of windows according to the present invention.

A description will now be given, with reference to FIG. 5, of a structure of an apparatus according to the present invention. FIG. 5 is a block diagram of the apparatus according to the present invention for displaying a tree structure diagram of windows.

The apparatus shown in FIG. 5 comprises a window relation file 100, an icon storing file 200, a display control unit 300, a display apparatus 400, a mouse 500, an icon creating unit 600 and an icon master file 700. The window relation file 100 stores information of parentage among windows. The icon storing file 200 stores hierarchy information and icon information of each window. The display control unit 300 controls a display of an index (an identifier) of each of windows by a hierarchical structure. The display apparatus 400 displays information including the index, window and messages on a screen. The mouse 500 is used for inputting instructions from an operator. The icon creating unit 600 creates an icon when a window is created. The icon master file 700 registers icons created by icon creating unit 600 and the identifiers of the respective windows.

The window relation file 100 is stored in a predetermined memory area of a work station. In the window relation file 100, windows having the same parent window are related as brother windows. The window relation file 100 stores information of a window by relating the window to a parent window, a next brother window and a child window so that the highest order window can always be accessed by following the relationship (parentage) among the windows.

Figure 6:
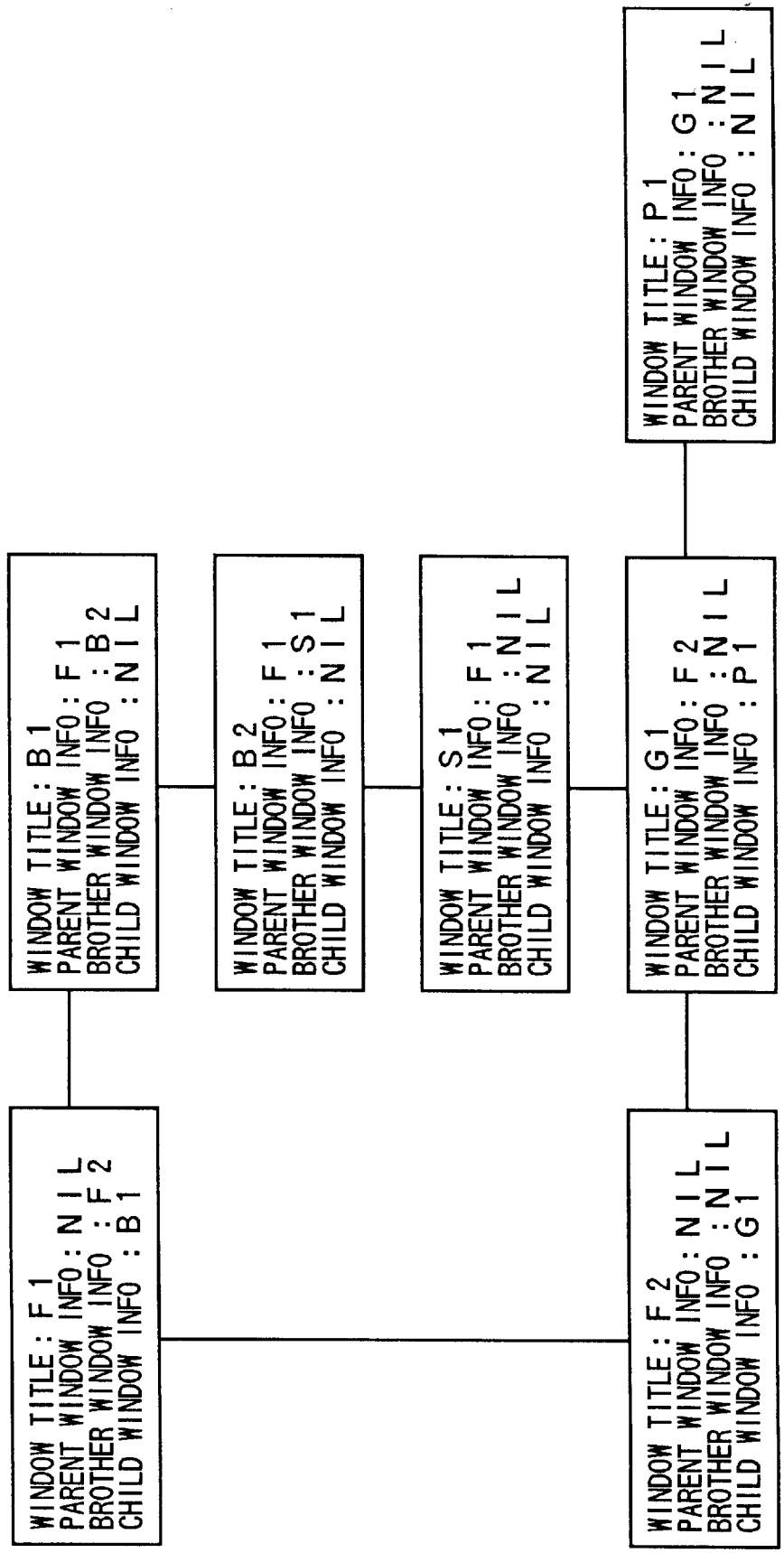
FIG. 6 is an illustration for explaining contents of a window relation file shown in FIG. 5.
Figure 7:
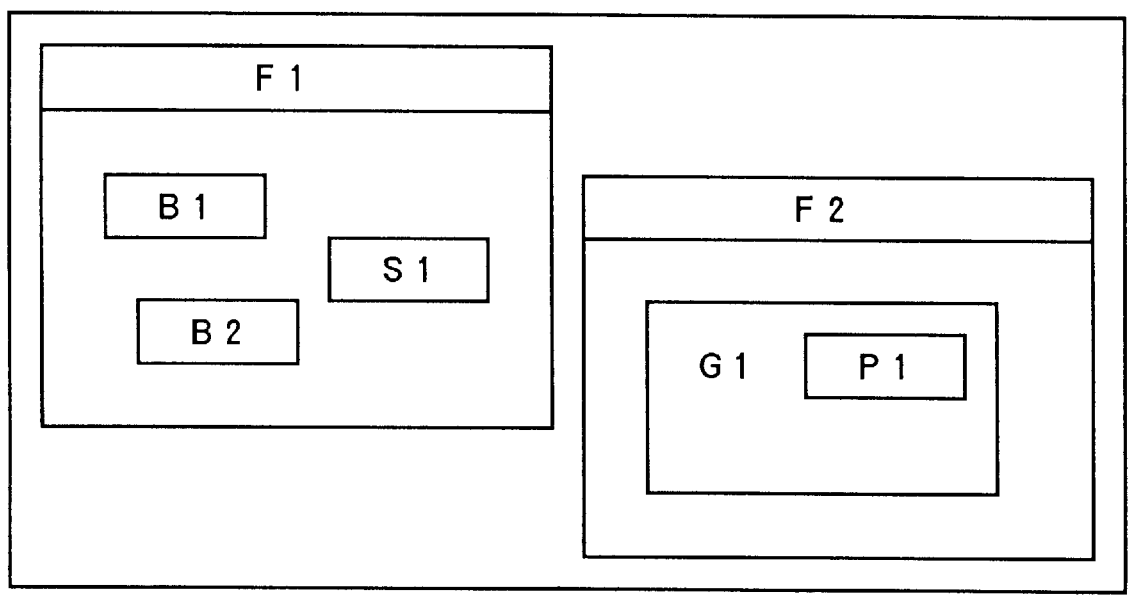
FIG. 7 is an illustration of the screen of a display apparatus, window information of the window relation file being displayed on the screen.

The window relation information includes information of each window. The information of each window includes window name, parent window information, brother window information and child window information. FIG. 6 shows contents of the window relation file 100. FIG. 7 is an illustration of the screen of the display apparatus 400 on which screen the window information in the window relation file 100 is displayed.

In FIG. 6, windows having titles "F1" and "F2" are parent windows (the highest order windows). There are three child windows "B1", "B2" and "S1" with respect to the parent window "F1". The child windows "B1", "B2" and "S1" are defined as brother windows since they have the same order relative to the parent window "F1". In the case shown in FIG. 6, none of the child windows "B1", "B2" and "S1" has a child window. The parent window "F2" has a child window "G1". The child window "G1" has a child window "P1". The child window "G1" does not have a brother window.

The windows having the above-mentioned relationship is displayed on the screen of the display apparatus 400 as shown in FIG. 7. That is, the parent windows "F1" and "F2" are separately displayed on the same screen; the three child windows "B1", "B2" and "S1" are provided within the parent window "F1"; the child window "G1" is provided within the parent window "F2"; and the child window "P1" is provided within the child window "G1".

The icon storing file 200 stores the window information from the window relation file 100. The window information stored in the icon storing file 200 includes a hierarchical order number (level number) added to each window. The level number is added by the display control unit 300. The display control unit 300 also reads icon information from the icon master file 700, and adds the icon information to the corresponding window information. For example, the hierarchical order number is added in such a way that the highest order window (parent window) is provided with the level number "0", and a window having the next order is provided with the level number "1". A tree structure diagram of the windows can be prepared based on the level numbers added to each window.

Figure 9:
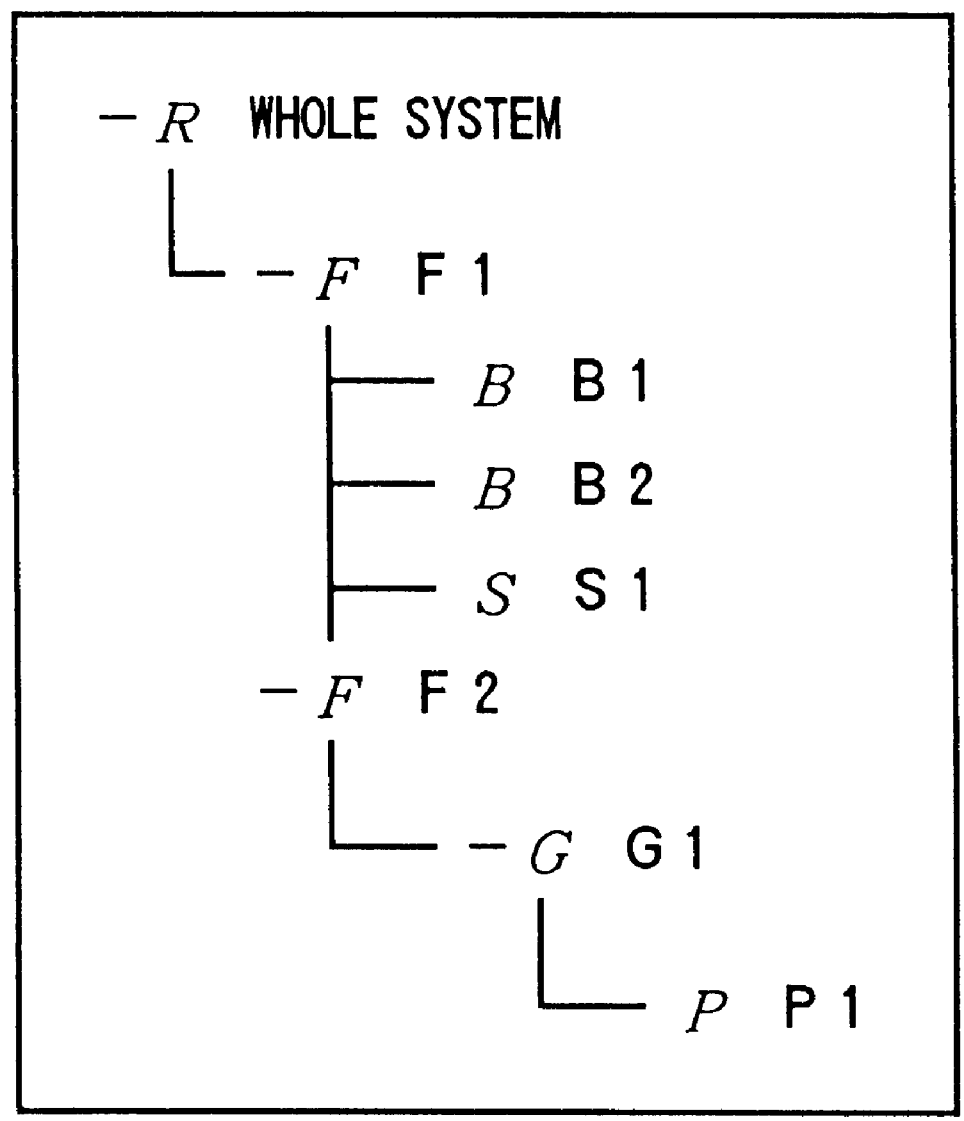
FIG. 9 is an illustration for explaining a display of the icon information in the icon storing file.

FIG. 8 is an illustration for explaining the contents of the icon information stored in the icon storing file 200. FIG. 9 is an illustration for explaining the contents of the icon storing file 200 displayed on the screen of the display apparatus 400. As shown in FIG. 8, the level number of the parent window is "0"; the level number of a child window of the parent window having the level number "0" is "1"; the level number of a child window of the window having the level number "1" is "2"; the level number of the child window of the window having the level number "2" is "3". That is, the window having a title "whole system" has the level number "0" and icon information "R". The icon information "R" corresponds to an icon having an image of an entire system. For example, an icon having an image of a house may be provided to a window prepared for a program related to an application of a house keeping work. Similarly, the window having a title "F1" has the level number "1" and the icon information "F". As mentioned above, when the information stored in the icon storing file 200 is displayed on the screen of the display apparatus 400, the titles of the windows are displayed with the respective icon information by a tree structure diagram as shown in FIG. 9.

The display control unit 300 reads the window relation file 100, the icon storing file 200 and the icon master file 700 so as to arrange the windows based on the tree structure. Additionally, the display control unit 300 may control other functions such as a scroll function of the display apparatus 400, a display function of windows and a font of characters to be displayed, according to instructions input through the mouse 500.

The display apparatus 400 displays various windows on the screen according to the control of the display control unit 300. The display apparatus 300 also displays various windows in accordance with an input through the mouse 500.

The mouse 500 is used for moving a cursor or a pointer to a desired window displayed on the screen and clicking the desired window to open or close. Additionally, a child window can be opened or closed by clicking the parent window.

The icon creating unit 600 creates an icon which will be registered to the icon master file 700 according to instruction input through the mouse 500. For example, when an icon which will be added to a window is created, one of icon samples provided in the work station is retrieved, and that icon sample is changed in a preferred form and size.

A description will now be given, with reference to a flowchart shown in FIGS. 10 and 11, of an operation of the apparatus shown in FIG. 5

Figure 10:
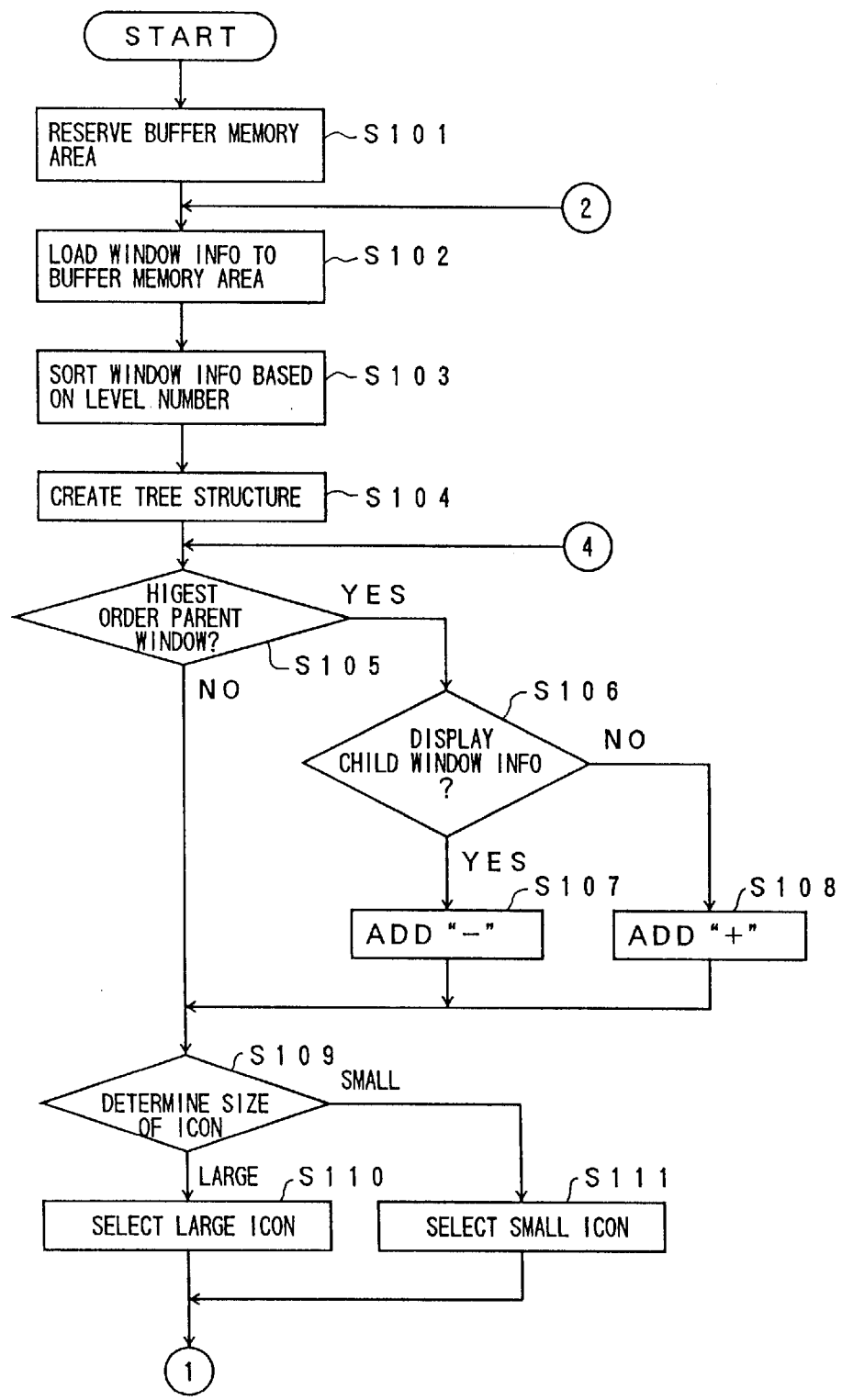
FIG. 10 is a part of a flowchart of an operation performed by the apparatus shown in FIG. 5.
Figure 11:
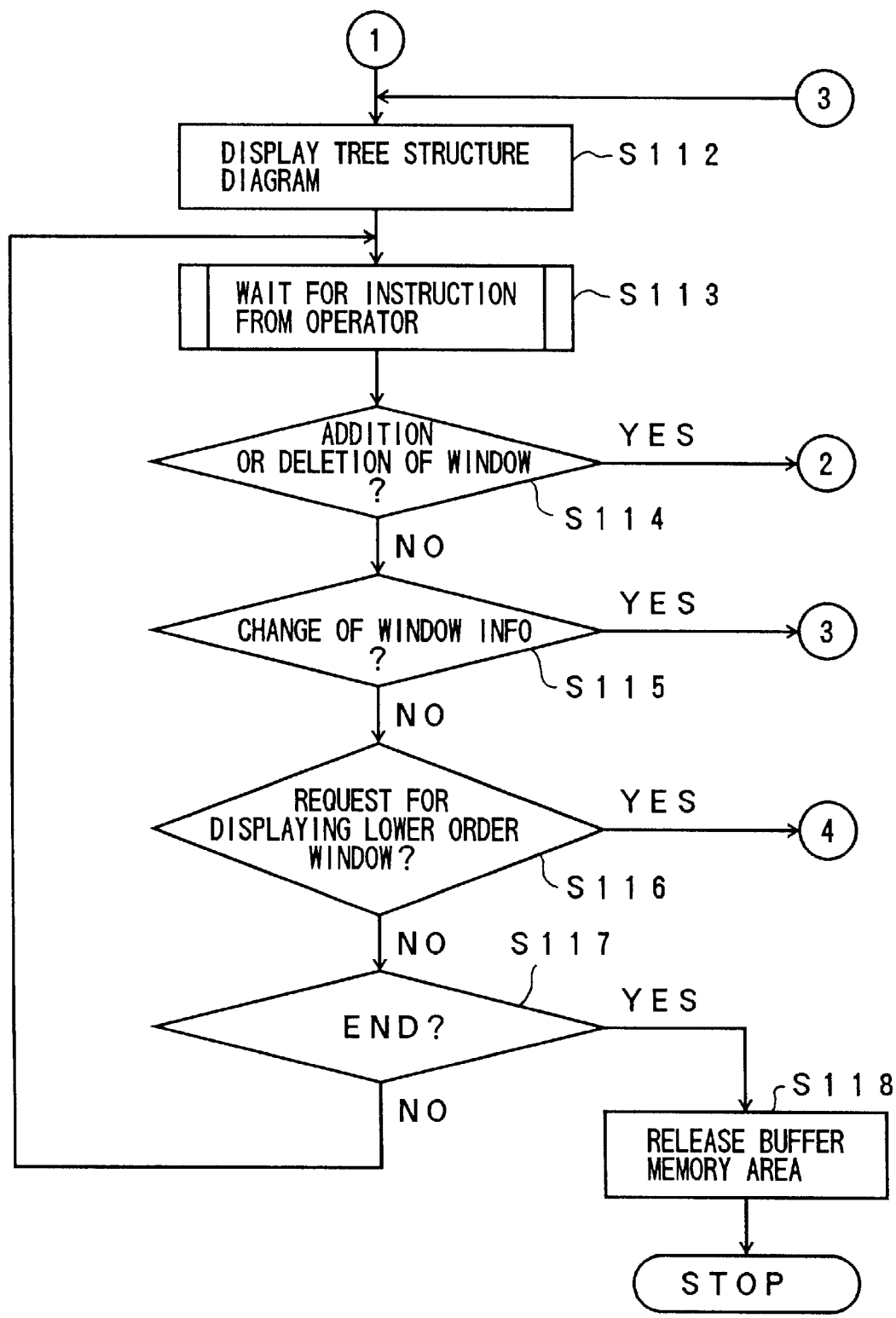
FIG. 11 is a part of a flowchart of an operation performed by the apparatus shown in FIG. 5.

When the operation shown in FIG. 10 is started, an area for the window relation file 100 and the icon storing file 200 is reserved, in step S101, in a memory area of the work station. The display control unit 300 then reads, in step S102, window information from the window relation file 100 so as to obtain the information regarding the relationship between the window corresponding to the window information read from the window relation file 100 and other windows. Then the level number of the window is determined for each window. Thereafter, the icon information corresponding to each window is retrieved from the icon master file 700. The icon information is added to the window information so that the window information is stored in the icon storing file 200 together with the corresponding icon information. Then, the information in the icon storing file 200 is loaded to a buffer memory area of the work station.

In step S103, the window information loaded from the icon storing file 200 is sorted based on the level number provided to each window. In step S104, the display control unit 300 sequentially reads the sorted window information in the buffer memory area so as to create the tree structure diagram to be displayed on the screen of the display apparatus 400.

It is then determined, in step S105, whether or not the window read from the icon storing file 200 is the highest order parent window (level number=0). If it is determined that the window is the highest order parent window, the routine proceeds to step S106. If it determined that the window is not the highest order parent window, the routine proceeds to step S109.

In step S106, it is determined whether or not to display the information of a child window. If it is determined that the information of a child window is to be displayed, the routine proceeds to step 107. If it is determined that the information of a child window is not to be displayed, the routine proceeds to step S108.

In step S107, a mark "−" is added to the title of the window, and then the routine proceeds to step S109. On the other hand, in step S108, a mark "+" is added to the title of the window, and then the routine proceeds to step S109. In step S109, a display size of the icon is determined. If it is determined that the icon is to be displayed in a large size, the routine proceeds to step S110. If it is determined that the icon is to be displayed in a small size, the routine proceeds to step S111.

In step S110, a large icon is selected to be displayed on the screen of the display apparatus 400, and the routine proceeds to step S112. In step Sill, a small icon is selected too be displayed on the screen of the display apparatus 400, and the routine proceeds to step S112. In step S112, the display control unit 300 displays the tree structure diagram comprising titles of windows and the respective icons on the screen of the display apparatus 400.

In step S113, the apparatus waits for an input from the operator through the mouse 500. The operator may input an instruction after viewing the tree structure diagram displayed on the screen of the display apparatus 400.

It is determined, in step S114, whether or not an addition or deletion of windows is selected by the operator. If it is determined that the operator selects an addition or deletion of windows, the routine returns to step 102. If it is determined that the operator does not selects either an addition or deletion of windows, the routine proceeds to step S115.

It is determined, in step S115, whether or not the operator selects a change of window information. If it is determined that the operator selects a change of window, the routine returns to step S112. If it is determined that the operator does not select a change of window, the routine proceeds to step S116.

It is then determined, in step S116, whether or not a window having orders lower than the lowest order windows currently being displayed on the screen is requested to be displayed. If the determination of step S116 is affirmative, the routine returns to step S105. Otherwise, the routine proceeds to step S117.

It is determined, in step S117, whether or not an inputting operation from the operator has ended, that is, an end of operation is selected by the operator. If it is determined that the end of operation is not selected, the routine returns to step S113. If it is determined that the end of operation is selected, the routine proceeds to step S118. In step S118, the buffer memory area reserved in the work station is released, and the routine is ended.

Figure 12:
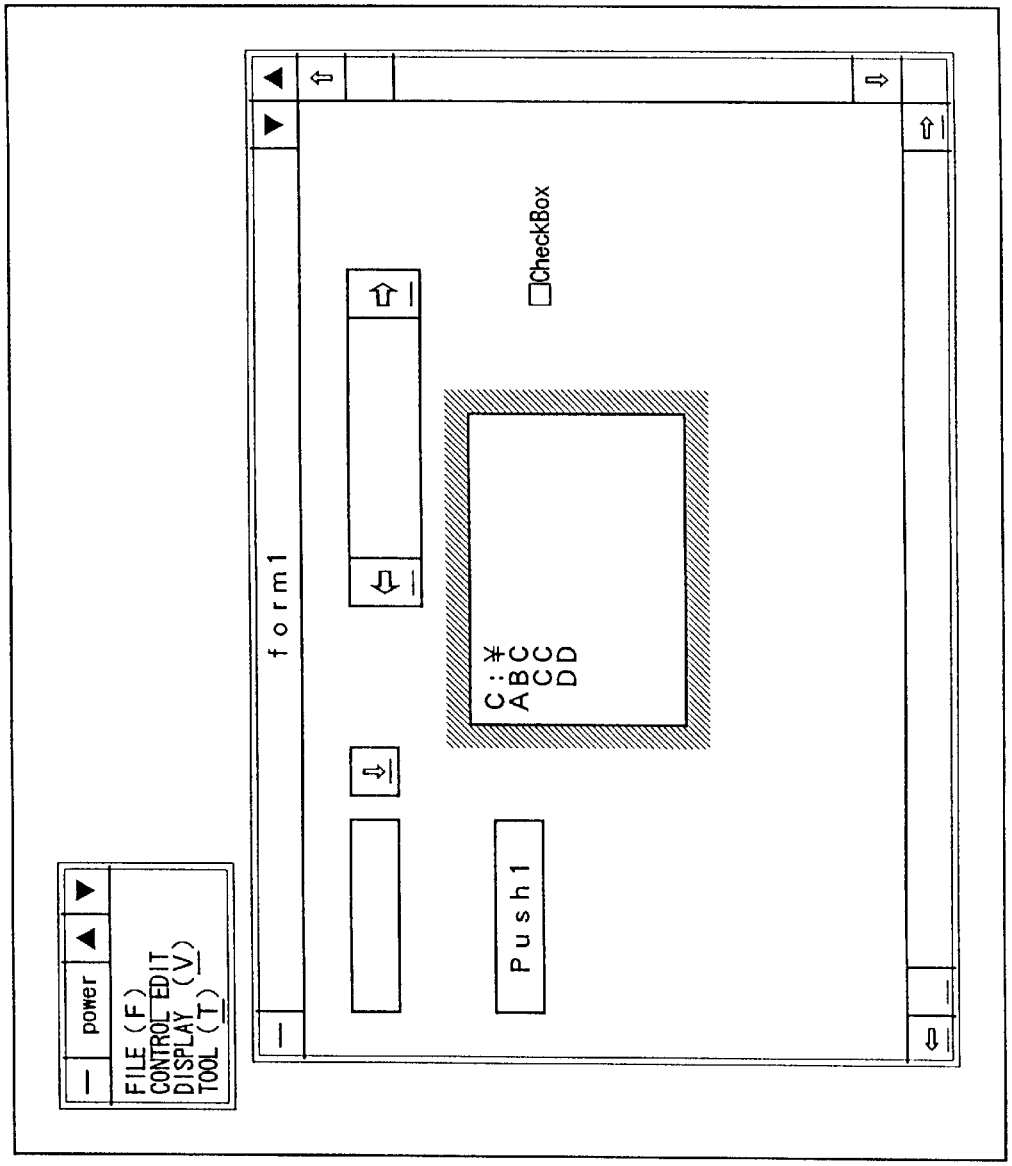
FIG. 12 is an illustration of an example of a window displayed by a first embodiment according to the present invention.

A description will now be given of embodiments of operations performed by the apparatus according to the present invention. FIG. 12 is an illustration for explaining a window displayed by a first embodiment of the present invention.

The window "form 1" shown in FIG. 12 has a parent window having a title "FAMILY 1". The window "form 1" has child windows "ComboBox", "Push 1", "HScroll 1", "ListBox" and "CheckBox 1". Thus, in this case, the contents of the window relation file 100 is as follows.

<window relation file>
Window Title: FAMILY
  Parent Window Information: none
  Brother Window Information: none
  Child Window Information: form 1
Child Window Title: form 1
  Parent Window Information: Exist
  Brother Window Information: None
  Child Window Information: ComboBox 1
    Push 1
    HScroll 1
    ListBox 1
    CheckBox 1

When the window relation file 100 is established, the icon master file 700 is created. The above-mentioned files are defined in the icon master file 700. At the same time, an icon is created for each window, which icon has an illustrative image representing the respective window, and the icon is registered to the icon master file 700. Icons already prepared in the system may be used to create the icon, or the operator may create the icon from the beginning.

Figure 13:
FIG. 13 is an illustration for explaining an example of information stored in the icon storing file shown in FIG. 5.
Figure 13:
Figure 13:
Figure 13:
Figure 13:
Figure 13:
Figure 13:

The icon storing file 200 is defined as shown in FIG. 13. The contents of the icon storing file 200 are sorted as shown in FIG. 13. The example shown in FIG. 13 has a range of levels from the level number "0" to "2". The window "FAMILY 1" is a parent window, and the window "form 1" is a child window of the window "FAMILY 1". The windows "ComboBox", "Push 1", "HScroll 1", "ListBox" and "CheckBox 1" are child windows of the window "FAMILY 1", and they are also brother windows to each other. Additionally, each icon stored in the icon storing file 200 has an image as illustrated in FIG. 13 so as to represent a function of the respective window.

Figure 14:
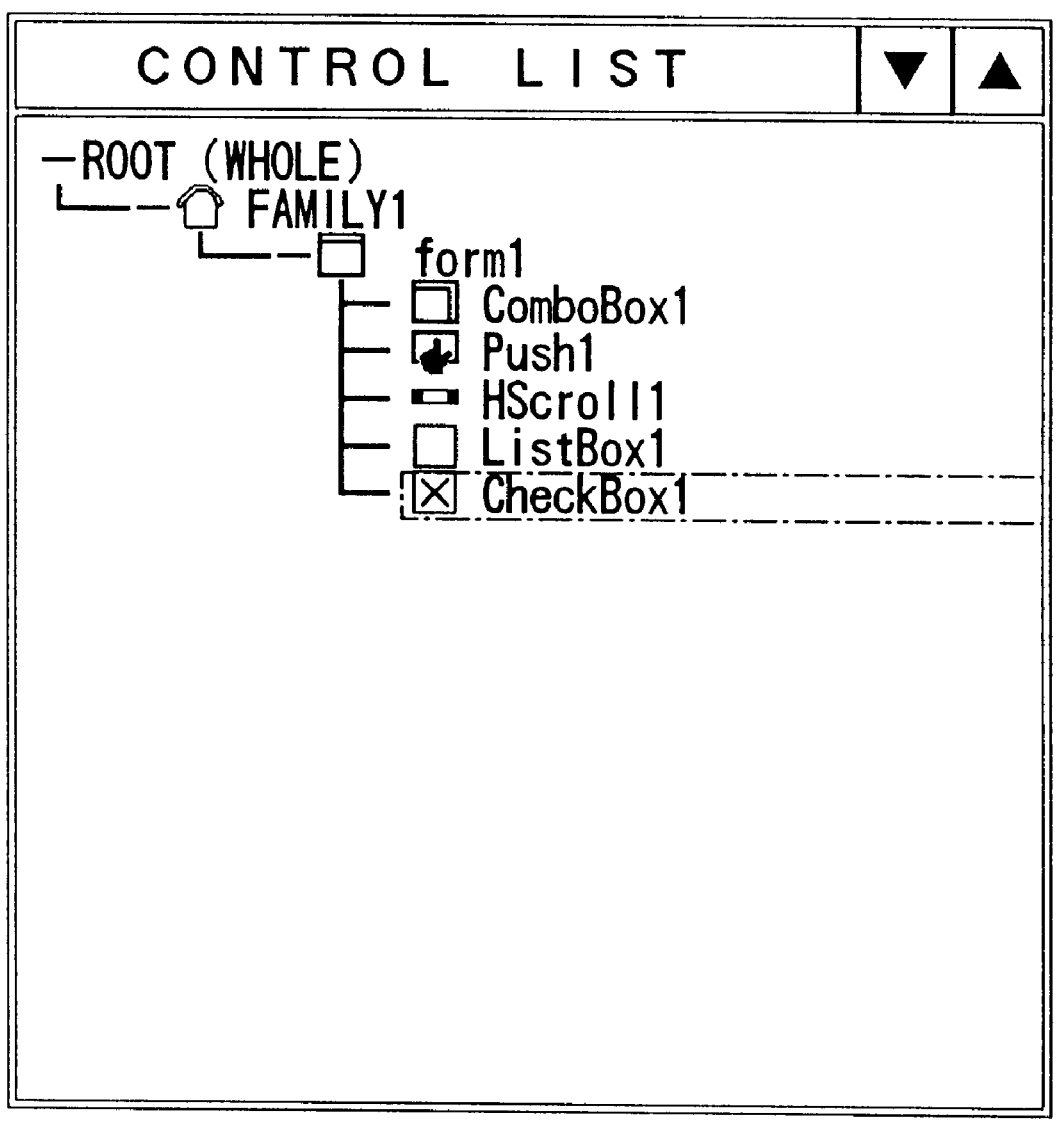
FIG. 14 is a tree structure diagram representing a parentage among windows corresponding to information shown in FIG. 13.

The display control unit 300 reads the icon storing file 200 so as to display the tree structure diagram shown in FIG. 14. As shown in FIG. 14, the tree structure diagram is comprised of titles of the windows with respective icons in front of each title. if the operator selects the "CheckBox" in the figure, the window corresponding to the title "CheckBox" is open.

Additionally, the marks "+" or "−" is provided in front of the title of the window. These marks represent whether or not the window having a title with one of the marks has a child window. In FIG. 14, the window "form 1" which is a child window of the window "FAMILY" has five child windows. In order to indicate this condition, the mark "−" is provided in front of the title of the window. If the window has a child window which is not to be displayed in the tree structure diagram, the mark "+" is provided in front of the title.

As mentioned above, by preparing the tree structure diagram comprised of icons, it becomes possible to easily and quickly understand the functions of each of the windows provided in the window "FAMILY 1". It should be noted that although the marks "+" and "−" are used for indicating whether or not a child window of each window is being displayed, any marks which can indicate the parentage may instead be used.

Figure 15:
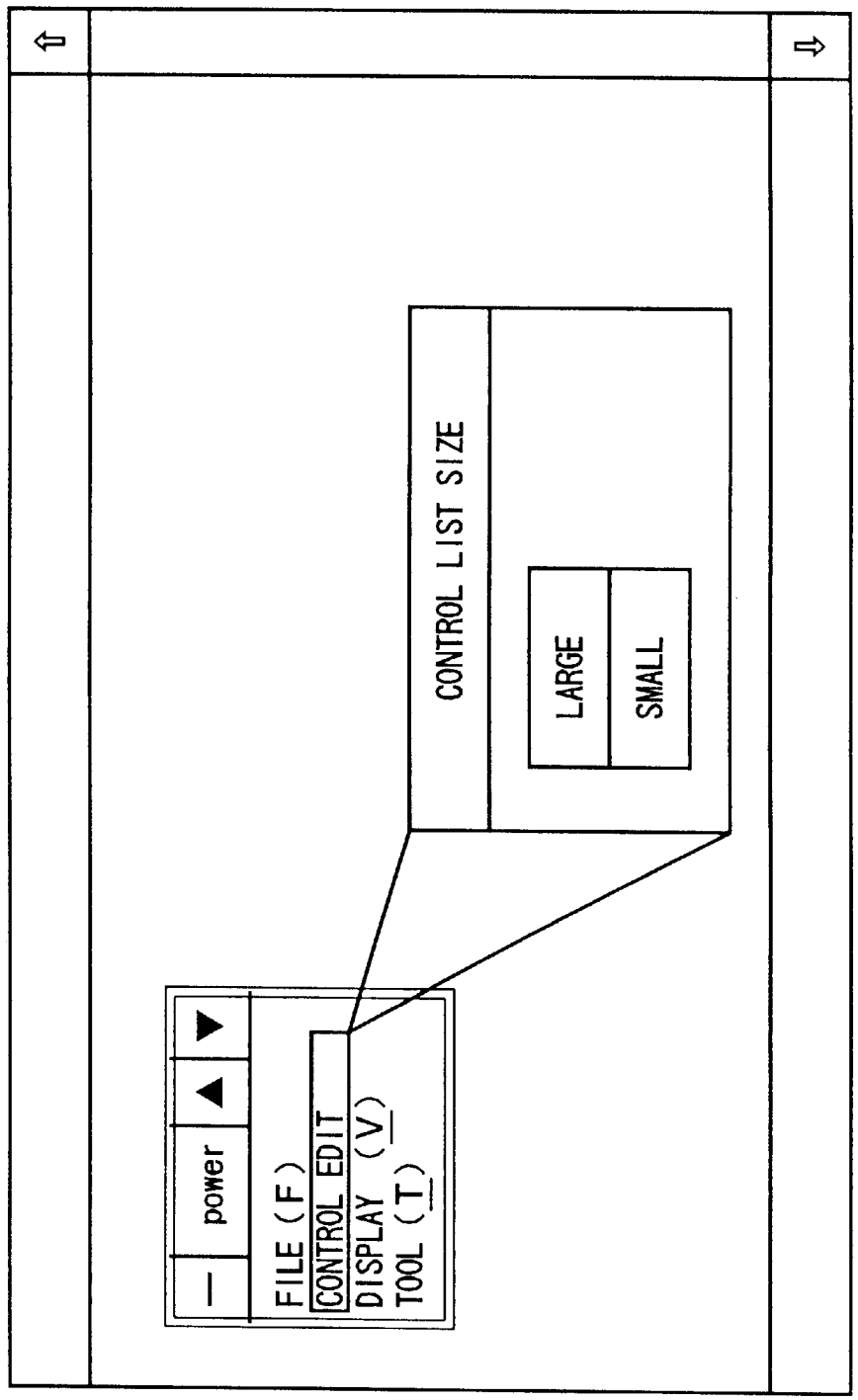
FIG. 15 is an illustration of a display for selecting the size of an icon.
Figure 16:
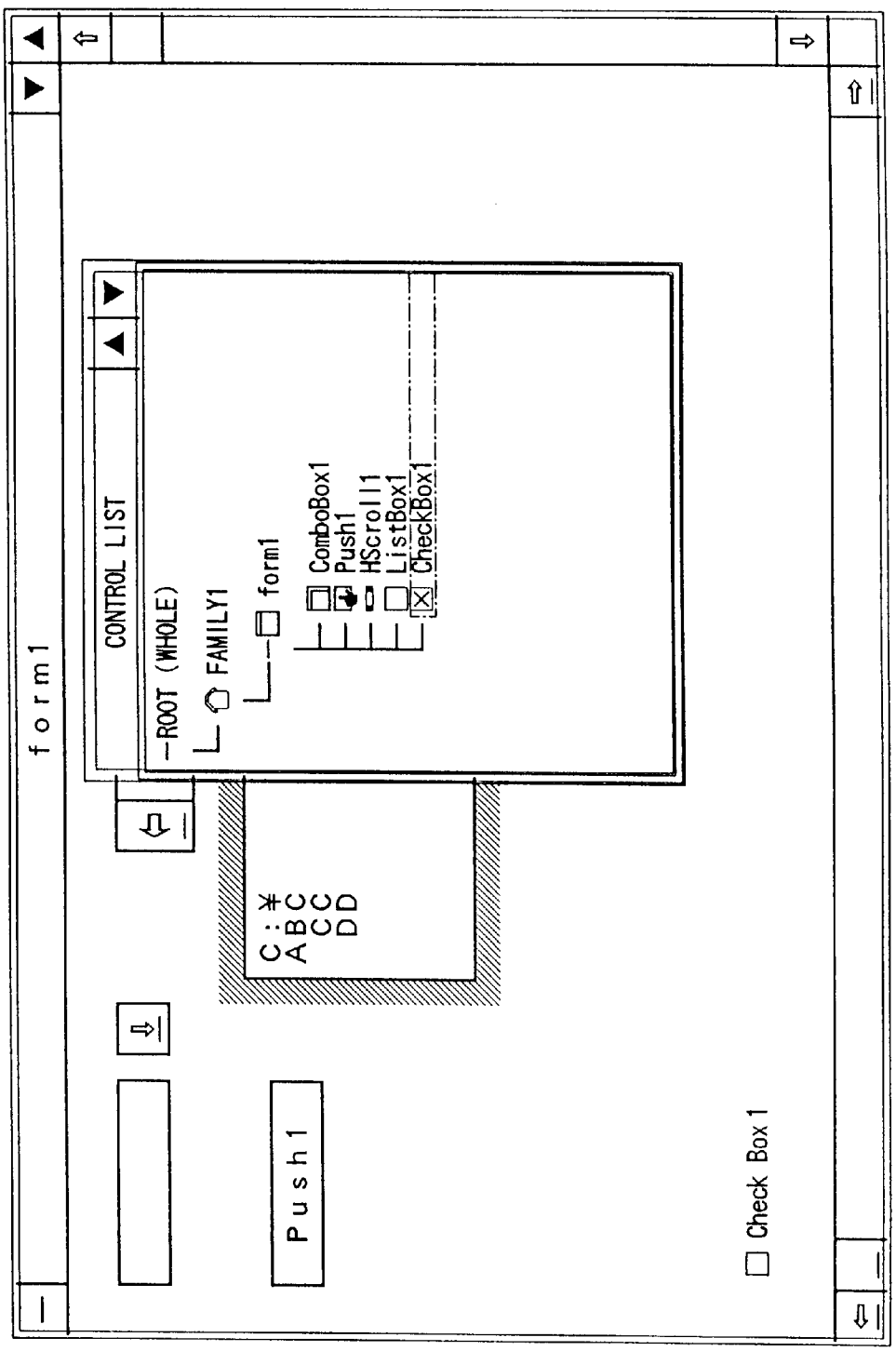
FIG. 16 is an illustration of an example for displaying a control list window according to a second embodiment of the present invention.

A description will now be given of a second embodiment according to the present invention. The second embodiment is the same as the first embodiment except for the size of the icons and the windows displayed on the screen of the display apparatus being changed. In this case, a window for selecting the control list display size is displayed on the starting screen as shown in FIG. 15 so that a desired size can be selected for the icon. In the example shown in FIG. 15, the selection can be made between two sizes such as a large size and a small size. However, several kinds of fonts may be displayed so that a desired font can be selected. Additionally, the size of the window for selecting the control display size may be selected. For example, as shown in FIG. 16, the control list window may be displayed in a part of a current window displayed an screen of the display apparatus 400 in an overlapped relationship.

Figure 17:
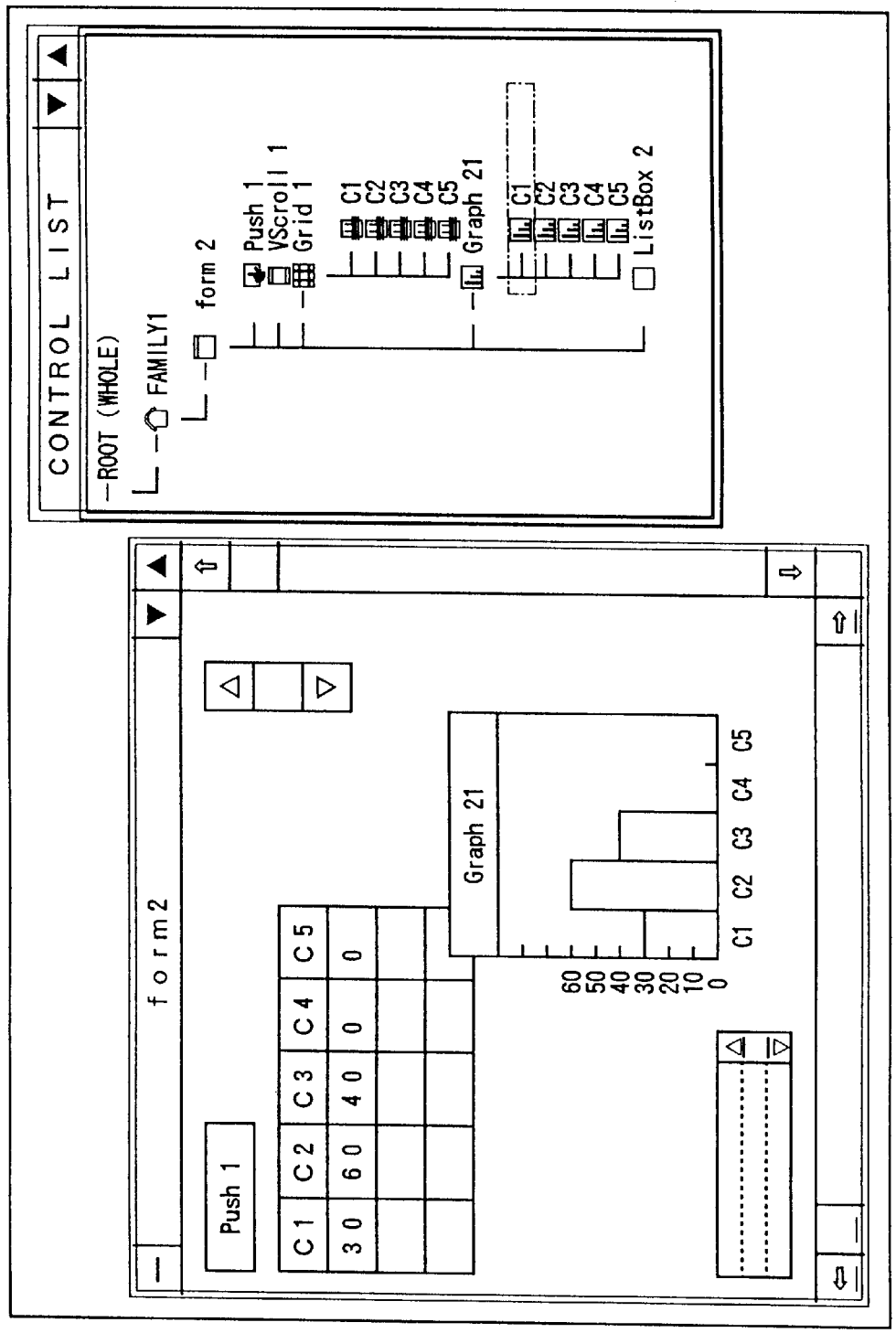
FIG. 17 is an illustration of an example of a control list window according to a third embodiment of the present invention.

A description will now be given of a third embedment according to the present invention. In the third embodiment, when the operator selects one of the windows from the control list window displayed on the screen of the display apparatus 400 and if the selected window is the lowest order window, the window one level higher than the level of the selected window is also displayed on the same screen. It is assumed that the operator selects the window "C1" from the control list window shown in FIG. 17. The window "C1" is a child window of the window "Graph 21", and is at the lowest order. Since the window "C1" represents one of values of a graph and the one of the values is to be compared with other values represented by other windows such as windows "C2" and "C3", the display control unit 300 automatically displays the window at least one level higher than the selected window "C1". Accordingly, when the window "C1" is selected, the windows one level higher than the window "C1" is automatically and simultaneously displayed on the screen of the display apparatus 400.

A description will now be given of a fourth embodiment according to the present invention. In the fourth embodiment, the icon creating unit 600 creates an icon which represents a function of a window when the window is newly created. In this case, the icon may be created by retrieving and changing, if necessary, an icon which was already registered in the system. The changed icon will be registered in the icon master file 700. Alternatively, the operator may create an illustration of an icon on the screen of the display apparatus 400 by using the mouse 500. The illustration and the title of the corresponding window are registered in the icon master file 700.

For example, when the present system is an application of a home security system, windows having titles of "Fire Prevention" and "Disaster" may be created as parent windows corresponding to the level number "0", and they are registered in the icon storing file 200. Additionally, icons having images such as a fire extinguisher or an alarm are created and registered also in the icon creating file 200. Thus, it is determined that what is indicated by an illustration of icon without displaying the title of the corresponding window. Accordingly, by clicking, for example, the icon having an image of a fire extinguisher, the window indicating the position of fire extinguishers may be displayed on the screen of the display apparatus 400.

The present invention is not limited to the specifically disclosed embodiments, and variations and modifications may be made without departing from the scope of the present invention.

What is claimed is:

1. A method for representing a hierarchical relation between elements and sub-elements of a window, the method comprising the steps of:

identifying elements and sub-elements in a window to be displayed on a monitor;

relating an icon to each element and each sub-element of the window to be displayed, each icons representing a function or attribute of one of the elements or sub-elements to which the icon is related; and displaying a tree structure diagram corresponding to data used to form the window, independently of the window being described by the tree structure diagram, using said icons to represent each of said elements and the sub-elements, wherein each element or sub-element is displayed with a designation representing a function or attribute of the element or sub-element.

2. The method as claimed in claim 1, further comprising the steps of:

c) registering a designation or parentage information of each element and sub-element, said parentage information indicating the presence of higher and lower order element related to each element;

d) setting a level number and an icon in accordance with said parentage information of each element and sub-element so that said tree structure diagram is displayed using said icon and a designation for each element in accordance with said level number.

3. The method as claimed in claim 1, wherein when an icon, representing an element or sub-element in a lowest order level, is selected from the tree structure diagram, and an element or sub-element at least one order higher than the selected element is displayed together with the selected element or sub-element.

4. The method as claimed in claim 1, further comprising the step of:

c) displaying a designation of each element and sub-element in conjunction with said icon in the tree structure diagram;

d) changing the size of said icons and the designation of said elements displayed in said tree structure diagram.

5. The method as claimed in claim 1, wherein a mark indicating a parentage is added to each element and sub-element in said tree structure diagram.

6. The method as claimed in claim 1, wherein said tree structure diagram is displayed only with said icon of each element and sub-element.

7. An apparatus for displaying a hierarchical relation between elements and sub-elements of a window, the apparatus comprising:

icon adding means for adding an icon to each element and each sub-element to be represented, each of said icons representing a function or attribute of one of the elements or sub-elements to which the icon is related; and displaying means for displaying a tree structure diagram corresponding to data used to form the window, independently of the window being described by the tree structure diagram, using said icons to represent each of said elements and sub-elements, wherein each sub-element is displayed with a designation of the sub-element.

8. The apparatus as claimed in claim 7, further comprising mark adding means for adding a mark indicating a parentage of each element and sub-element in said tree structure diagram.

9. The apparatus as claimed in claim 7, wherein elements or sub-elements having the same parent are defined as, brothers, and said displaying means comprises first storing means for storing information of a child, when a brother has said child, by relating with said brother, together with a designation of said child.

10. The apparatus as claimed in claim 9, wherein said icon adding means comprises:

icon storing means for storing said icon of said each element and sub-element; and second storing means for adding an icon and a level number to each element and sub-element in accordance with window relation information supplied by said first storing means, and storing window information sorted based on said level numbers.

11. The apparatus as claimed in claim 10, wherein said icon adding means comprises icon creating each element and sub-element, said icon being stored in said icon storing means.

12. The apparatus as claimed in claim 11, wherein said icon creating means defines a plurality of sizes of said icon which can be selected by an operator.

13. A method for representing a hierarchical relation between elements and sub-elements of a window in a graphical user interface, the method comprising the steps of:

identifying elements and sub-elements in a window to be displayed on a monitor;

relating an icon to each element and each sub-element of the window to be displayed, each icon representing a function or attribute of the related element or sub-element;

storing the icon in an icon master file with information related to the related element or sub-element; and displaying a tree structure diagram corresponding to data used to form the window, independently of the window being described by the tree structure diagram, using icons retrieved from the icon master file so as to represent each element and the sub-element in the window, wherein each sub-element is displayed with a designation of the sub-element.

* * * * *